Nov. 15, 1938.   J. B. TIEDEMANN   2,136,477
FRAME TRANSFERRING MECHANISM AND DRIVE THEREFOR
Original Filed Dec. 11, 1933   7 Sheets-Sheet 1

Julius B. Tiedemann
INVENTOR.
BY
ATTORNEY.

Nov. 15, 1938.        J. B. TIEDEMANN        2,136,477
FRAME TRANSFERRING MECHANISM AND DRIVE THEREFOR
Original Filed Dec. 11, 1933        7 Sheets-Sheet 4

Julius B. Tiedemann
INVENTOR.

BY
ATTORNEY.

Nov. 15, 1938.   J. B. TIEDEMANN   2,136,477
FRAME TRANSFERRING MECHANISM AND DRIVE THEREFOR
Original Filed Dec. 11, 1933    7 Sheets-Sheet 6

Julius B. Tiedemann
INVENTOR.
BY
ATTORNEY.

Nov. 15, 1938.     J. B. TIEDEMANN     2,136,477
FRAME TRANSFERRING MECHANISM AND DRIVE THEREFOR
Original Filed Dec. 11, 1933     7 Sheets-Sheet 7

Julius B. Tiedemann
INVENTOR.
BY
ATTORNEY.

Patented Nov. 15, 1938

2,136,477

UNITED STATES PATENT OFFICE 2,136,477

FRAME TRANSFERRING MECHANISM AND DRIVE THEREFOR

Julius B. Tiedemann, Milwaukee, Wis., assignor to A. O. Smith Corporation, Milwaukee, Wis., a corporation of New York Original application December 11, 1933, Serial No. 701,842, now Patent No. 2,057,351. Divided and this application September 12, 1936, Serial No. 100,416

7 Claims. (Cl. 214—1)

The invention relates to improvements in frame transferring mechanism and drive therefor, and has found specific embodiment in an apparatus employed in the manufacture of automobile frames. The system and apparatus for the manufacture of the frames constitutes a semi-automatic plant embodying the general principles and features of the United States Letters Patent No. 1,397,020, issued to R. Stanley Smith, and of several improvement patents all of which have been assigned to the A. O. Smith Corporation.

The present invention embodies an improvement in frame transferring mechanism designed to transfer the partially assembled frame structures to an assembling machine and to remove the assembled frame from the machine.

The frames are partially assembled on conveyor trucks and carried thereon to the transfer mechanism which removes the frame elements from a truck while retaining their relative positions and deposits the elements in the same relative position upon the supports of the assembling machine. This machine then assembles the elements into a unitary frame and inserts rivets in aligned openings in the several parts to temporarily secure the elements together. The transfer mechanism then removes the assembled frame and deposits the same upon a conveyor truck which subsequently transports the frame to a plurality of stations where riveting machines are caused to set the various rivets to complete the frame as more fully described in co-pending application Serial No. 501,301, filed December 10, 1930, by Birger T. Andren and Julius B. Tiedemann and assigned to the same assignee as the present case.

The present application constitutes a division of application Serial No. 701,842, filed December 11, 1933 for Frame transferring mechanism and drive therefor, on which Patent No. 2,057,351 was granted October 13, 1936.

The principal object of the invention is to provide a transfer mechanism for the purpose intended which is simple in construction and which has few wearing parts, thereby making repair and upkeep less expensive.

Another object is to provide such an apparatus which will substantially increase the rate of production and allow the employment of a much shorter working cycle of operation.

Another object is to provide a new type of drive for the transfer mechanism which will greatly increase the speed of operation and which will also eliminate objectionable vibration and provide a smooth operation having the proper timed cycles for each function of the machine.

Other objects will appear hereinafter in connection with the more detailed description of the preferred embodiment of the invention illustrated in the accompanying drawings.

The machine comprises, in combination with a conveyor system, a transfer mechanism, assembling mechanism, rivet supplying and driving mechanism, and a single drive for the various elements.

The conveyor system which supplies the parts to be assembled and carries away the assembled frame may be of any suitable design. That shown in the drawings comprises two separate systems, one for bringing the parts to be assembled to the machine, and the other for taking the assembled frames away.

In general, the conveyor for supplying parts to the machine comprises a right-hand set of parallel rails 1 and a left-hand set of parallel rails 2, each set providing a conveyor track upon which the trucks 3 are mounted for intermittent movement. The trucks 3 are transferred from one set of rails to the other at the ends of the rails by means of screw conveyors 4 operating from the same drive as that for the trucks on the track and providing a closed circuit or path for movement of the trucks.

The trucks 3 have individual adjustable supports 5 thereon for receiving the various frame elements in juxtaposed relation for assembly. As the trucks 3 pass intermittently along the rails 1 toward the assembly machine, workmen posted at the various stations along the rails place the several frame elements in position on the trucks. When the truck has received a complete frame and reached the end of the rails 1, it is transferred laterally toward the assembly machine to the end of the set of rails 2, by means of the screw conveyors 4.

The frame transfer mechanism, as more fully described hereinafter, then picks up each individual frame element from the truck 3 and deposits it in the assembly machine, leaving the truck 3 empty. The empty truck then passes down rails 2 to the other end of the conveyor line where it is transferred to rails 1 by means of screw conveyors operating in the same manner as the screw conveyors 4 shown in the drawings at the end of the track adjacent the assembly machine.

In general, the conveyor for removing assembled frames from the machine is constructed similar to that just described and embodies two sets of rails 6 and 7 upon which a plurality of trucks 8 are mounted for intermittent movement. Screw conveyors 9, only one of which is shown, are also provided at the ends of the rails for transferring the trucks from one set to the other in the same manner as that previously described. The adjustable supports 10 on each truck are adapted to receive the assembled frame and hold it during transport.

The conveyor systems, generally described above, may be constructed in any suitable manner, or eliminated and other suitable means provided for performing the functions described.

The assembling mechanism, with which the present invention finds its use, may have various details of construction depending upon the structure to be assembled. The mechanism illustrated diagrammatically in the drawings is for use in assembling automobile frames.

The frame transferring mechanism comprises, in general, a vertically movable track 11, a horizontally movable truck 12 mounted on the track 11, and transfer carriages 13 and 14 carried by the truck.

The vertically movable track 11 comprises two parallel rails extending across the entire machine and across the sets of conveyor rails 2 and 7, one at each end of the machine. Each rail is supported on two screw jacks 15 and the rails may be raised or lowered by operation of these jacks.

The rails are additionally supported by means of a plurality of air cushion cylinders 16 which serve to cushion the downward movement of the rails and to facilitate raising the rails. In the preferred embodiment illustrated, four cylinders 16 are provided for each rail and are distributed about equally apart along the rail to properly balance the latter whether the truck 12 is at one end or the other of the rails.

The truck 12 comprises a rectangular frame having side bars 17 and two tubular cross bars 18. Wheels 19 support the truck on the track 11.

The carriage 13 is suspended from one tubular cross bar 18 while the carriage 14 is suspended from the other tubular cross bar 18.

The carriage 13 comprises two bars 20 and 21 extending parallel to the respective cross bar 18. The carriage bars 20 and 21 are suspended at each end by links 22 hanging from a yoke 23 fixed to the corresponding end of the respective cross bar 18. The mode of suspension is such that one bar 20 of carriage 13, for instance, is suspended from the yokes 23 on one side of the cross bar 18, and the other bar 21 of the carriage is suspended from the yokes 23 on the other side of the cross bar 18, the bars tending to balance each other. The links 22 allow relative movement of the bars 20 and 21 toward and away from each other as will be explained hereinafter.

Carriage 14 is constructed similarly to carriage 13 and comprises two bars 24 and 25 suspended by means of links 26 from the fixed yokes 27 on the other cross bar 18. The links 26 support the bars 24 and 25 for relative movement toward and away from each other as will be explained hereinafter.

The carriage 13 is adapted to carry the frame parts from a conveyor truck 3 and to deposit the parts upon the supports of the assembling machine. The carriage 14 is adapted to carry the assembled frame 28 from the assembling machine and to deposit it upon the supports 10 of the truck 8.

Carriage 13 is provided with a plurality of clamps mounted on the bars 20 and 21. The clamp 29 for carrying a cross bar of the automobile frame, for instance, comprises a depending hook 30 mounted on bar 20 and adapted to hook into one end of the cross bar, and a similar depending hook 31 mounted on bar 21 and adapted to hook into the other end of the cross bar. The hooks 30 and 31 are controlled by relative movement of bars 20 and 21 toward and away from each other to cooperate in clamping or releasing the cross bar, as desired.

The clamps 32 for carrying the side bars of the automobile frame comprise a pair of parallel transverse rods 33 and 34 having downwardly extending prongs at each end. Rod 33 is attached to bar 20 while rod 34 is attached to bar 21. The prongs 35 at the right-hand ends of the rods 33 and 34 are offset so that, as the carriage 13 is lowered over a truck 3, the prongs 35 on rods 33 will pass down on the right-hand side of the right-hand side bar while the prongs 35 on rods 34 will pass down on the left-hand side of the same side bar. Subsequent relative movement of the bars 20 and 21 toward each other will effect a clamping of the side bar between the prongs 35. One of the prongs 35 has a lateral extension 36 for passing under the side bar to prevent its accidental release from the clamp.

The left-hand side bar is clamped by means of prongs 37 mounted at the left-hand ends of rods 33 and 34 in a manner similar to the clamping of the right-hand side bar as just described.

The various parts of the clamps 29 and 32 are all adjustably mounted so as to accommodate any size, shape, or position of frame element.

Figure 1:
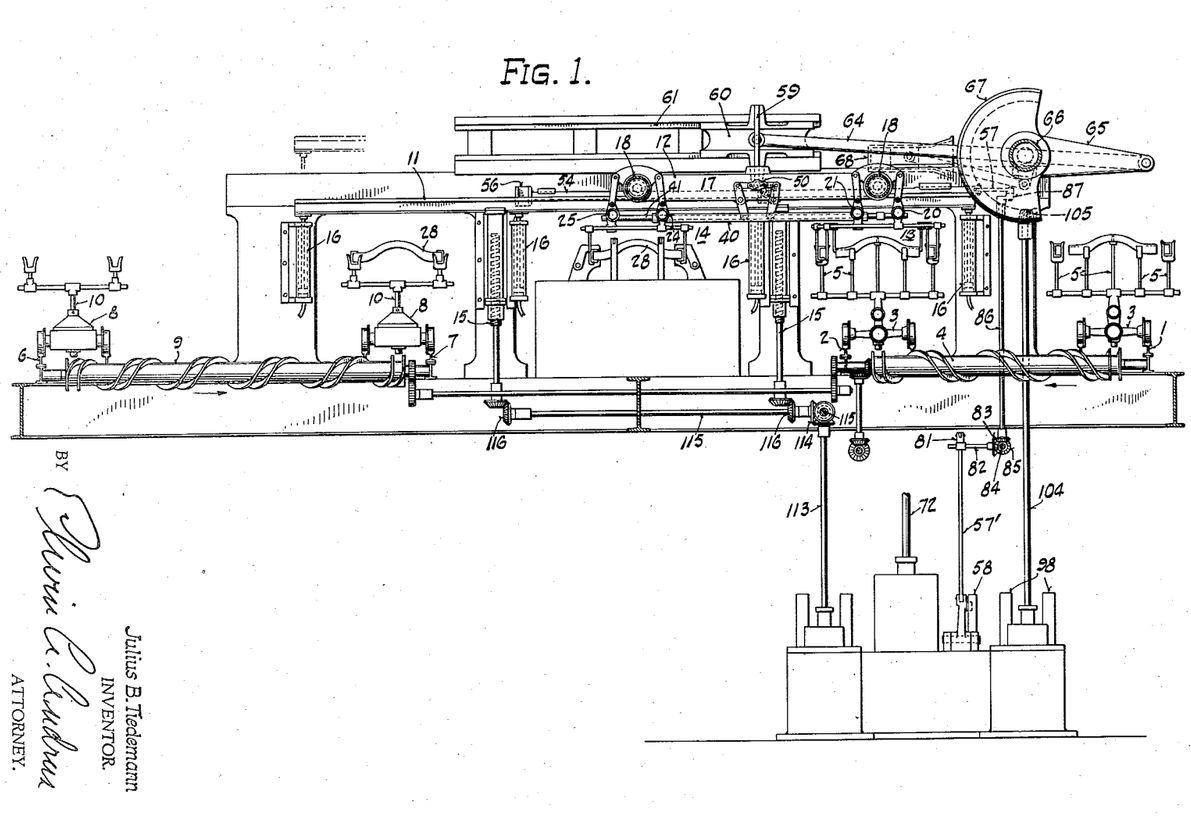
Figure 1 of the drawings is a transverse section of the mechanism showing schematically apparatus with which it is employed.
Figure 2:
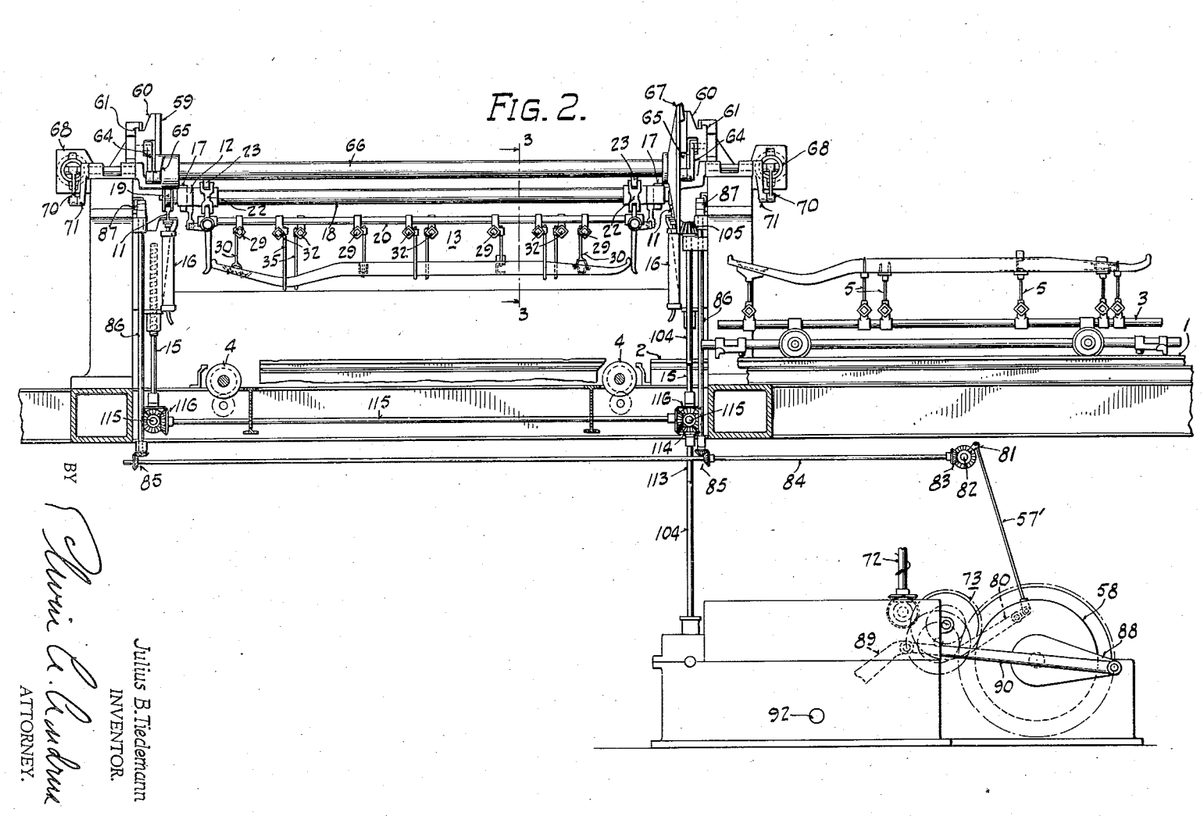
Fig. 2 is a side elevation of the same mechanism.
Figure 3:
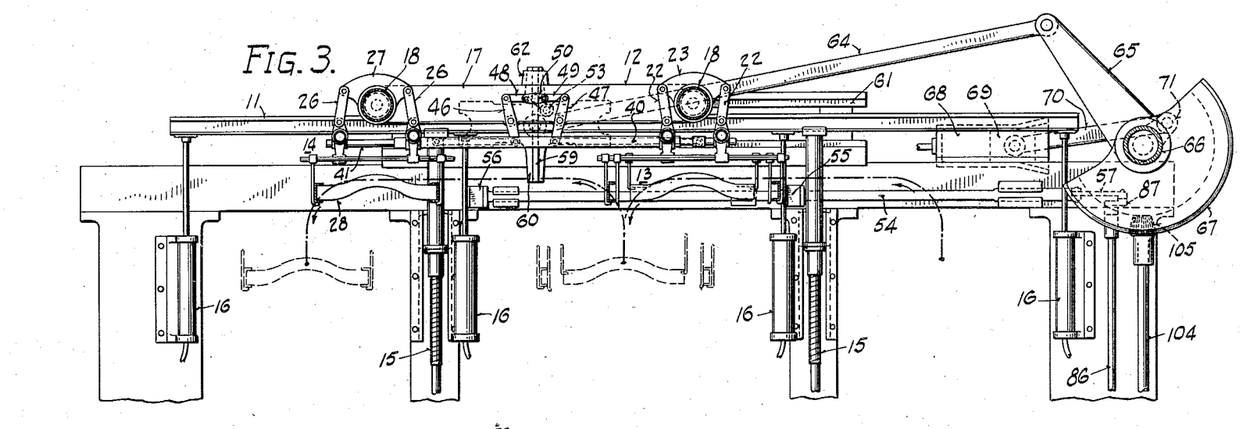
Fig. 3 is an enlarged vertical section of the transfer mechanism, alone, in its raised position, on line 3—3, of Fig. 2.
Figure 4:
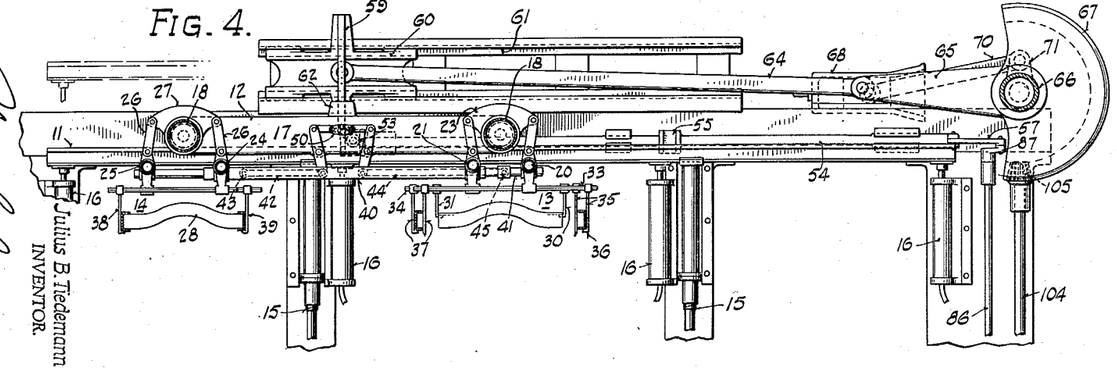
Fig. 4 is a similar sectional view of the transfer mechanism in its lowered position.
Figures 5, 6, 7:
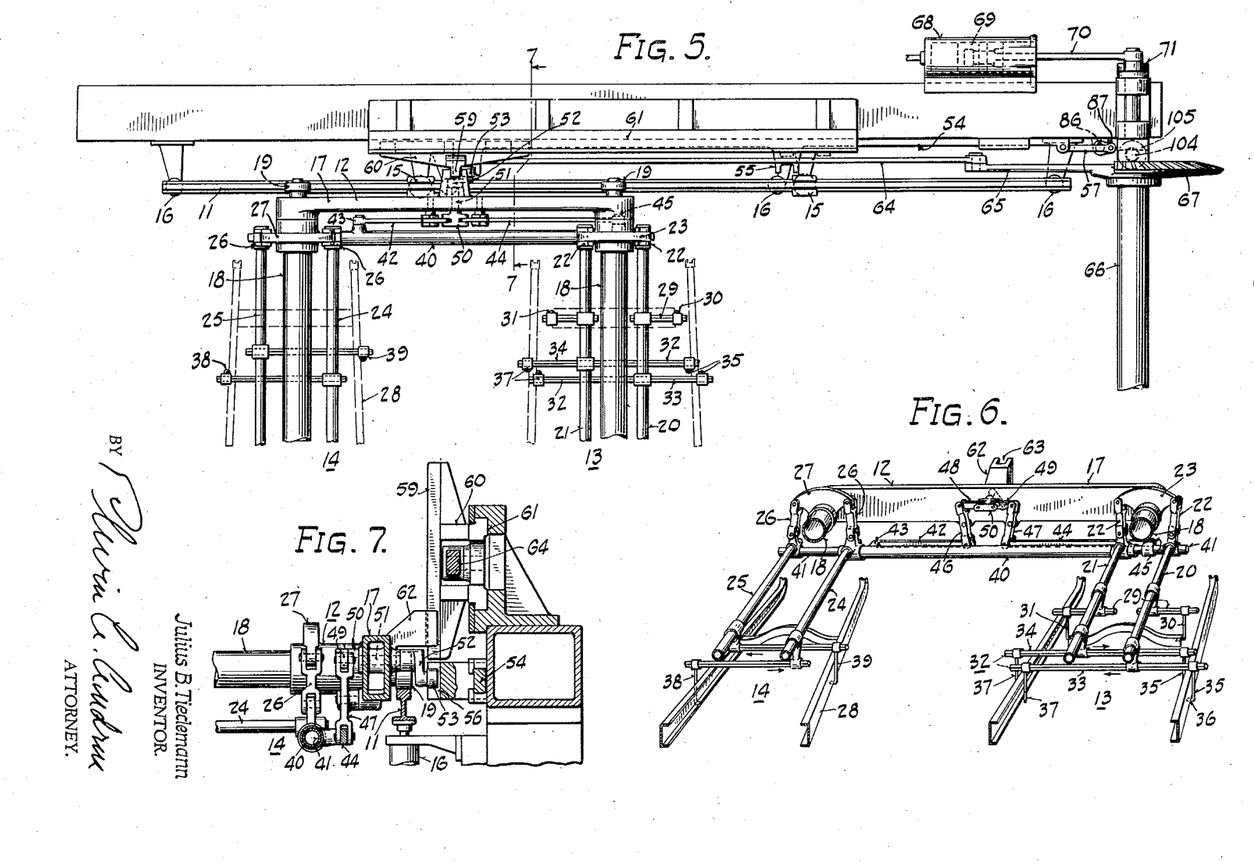
Fig. 5 is a top plan view of one end of the transfer mechanism.
Fig. 6 is a perspective view of the carriage showing the clamping and lifting mechanism thereon.
Fig. 7 is an enlarged detail sectional view taken on the line 7—7 of Fig. 5.
Figure 8:
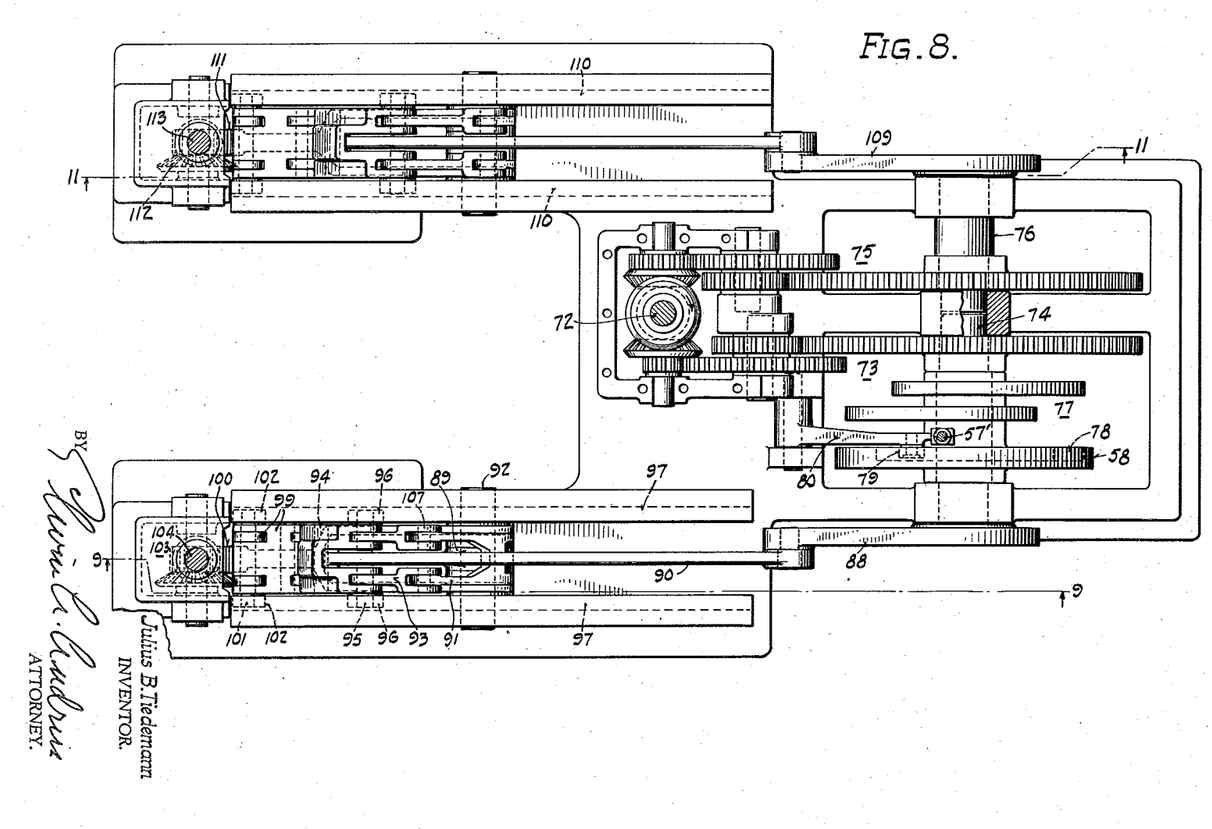
Fig. 8 is a top plan view of the drive for the machine.

Figure 1 illustrates the carriage 13 in position over a truck 3 with the several clamps 29 and 32 closed upon the respective frame elements. This closing of the clamps is accomplished simultaneously by movement of bars 20 and 21 toward each other. In the next step the carriage 13 is raised a predetermined amount by elevating the track 11, thereby lifting the frame elements from the truck 3. The carriage 13 is then moved laterally as illustrated in Fig. 3 to a position over the assembling machine by lateral movement of the truck 12 along the track 11. Then the carriage 13 is lowered, as shown in Fig. 4, to position the several frame elements upon the supports of the assembling machine. The bars 20 and 21 are then moved apart to open the clamps 29 and 32 and release the frame elements. The carriage is then raised and returned empty to a position over another truck 3 for picking up another group of frame elements.

During the transfer of a group of frame elements, they are maintained in the same predetermined relative position as provided in their placement on the trucks 3 so that after their deposit on the supports of the assembling machine, they are ready for immediate assembly.

The adjustable depending hooks 38 mounted on bar 24 and similar hooks 39 mounted on bar 25 are adapted to cooperate in picking up an assembled frame 28 and carrying the same to the truck 8. As shown, hooks 38 mounted on the right-hand bar 24 are adapted to lift the left-hand side of the frame 28 while hooks 39 mounted on the left-hand bar 25 are adapted to lift the right-hand side of the frame. By this arrangement the hooks 38 and 39 are adapted to pick up a frame when the bars 24 and 25 are moved away from each other and to release a frame when the bars 24 and 25 are moved toward each other.

Fig. 1 illustrates the carriage 14 over the assembling machine with the hooks 38 and 39 in position for lifting the assembled frame 28. The next step is that of raising the carriage 14 and with it the frame 28 by raising the track 11. Thereafter the carriage is transferred to the left to a position over a truck 8 by lateral movement of the truck 12 along the track 11. The track 11 is then lowered to effect a lowering of the assembled frame onto the supports 10 of the truck 8. The hooks 38 and 39 are then separated to release the frame by moving the bars 24 and 25 toward each other, and the carriage 14 is raised and returned empty to a position above the assembling machine.

Since both carriages 13 and 14 are suspended from truck 12, the cycle of operation of each carriage is identical with that of the other, so that both carriages are lowered simultaneously, one to pick up frame elements, and the other to pick up an assembled frame. Both carriages are then raised simultaneously and transferred to the left where both are again lowered, this time to release their respective loads, after which they are again raised and transferred simultaneously back to position for lowering and loading.

By reason of this simultaneous cycle of operation of the carriages 13 and 14, it is possible to provide a single means for driving all of the clamps and hooks in unison. This is accomplished by providing, at each end of the carriages, a tube 40 connecting the inner bars 21 and 24 and a longer tube 41 slidably mounted in the tube 40 and connecting the outer bars 20 and 25. Relative longitudinal movement of the tubes 40 and 41 will effect a relative movement of the carriage bars 20 and 21 toward or away from each other, as the case may be, and a relative movement of the carriage bars 24 and 25 away from or toward each other, as the case may be, the relative movement of bars 24 and 25 at any given time being opposite to that of bars 20 and 21.

The relative longitudinal movement of each set of tubes 40 and 41 is effected by a link 42 secured to tube 40, as at 43, and a link 44 secured to tube 41, as at 45. The inner ends of links 42 and 44 are pivotally secured to levers 46 and 47, respectively, which are fulcrumed at their centers to the truck bars 17. The upper ends of the levers 46 and 47 are connected by short toggle links 48 and 49, respectively, to the opposite ends of a rocker beam 50. The rocker beam 50 is secured to one end of a short pivot shaft 51 which extends through the side bar 17 of the truck 12. An arm 52 having a roller 53 on its free end is attached to the outer end of the shaft 51.

Operation of the arm 52 to the right as shown in Fig. 1 will effect a relative movement of bars 20 and 21 toward each other and of bars 24 and 25 away from each other to effect the desired clamping operations, while movement of the arm 52 to the left will effect a reverse movement of the bars and a release of the clamping members.

Operation of the arm 52 is effected only at the time when the truck 12 is lowered to either pick up a load or to release a load. That is, arm 52 is moved to the right when the truck is at the right-hand side of the machine and lowered ready to pick up a load, and the arm 52 is moved to the left when the truck is at the left-hand side of the machine and lowered ready to release its load. This movement of the arm 52 is effected by a horizontal reciprocating rod 54 having upright channel members 55 and 56 spaced horizontally thereon a distance equal to the lateral movement of truck 12. When the truck 12 is in its extreme right-hand position and lowered to pick up a load, the roller 53 engages in the channel 55. Movement of the rod 54 to the right then effects movement of the arm 52 to the right. When the truck 12 is in its extreme left-hand position and lowered to release its load, the roller 53 engages in the channel 56. Movement of the rod 54 to the left then effects movement of the arm 52 to the left.

The reciprocation of the rod 54 to the left or right at the required time in synchronism with the machine to obtain the desired clamping and release of frame members is obtained by suitable connections of the rod 54 to a link 57 operated by the continuously rotating cam disk 58, as will be explained hereinafter.

The arm 52 is, at all times during movement of the truck 12, locked either in its left or right-hand position, in order to prevent accidental operation of the clamping members on the carriages 13 and 14 and dropping of frame elements. This locking of the arm 52 is obtained by a vertical rib 59 on a cross head 60 at each end of the truck 12. The roller 53 is adapted to ride on either side of the rib 59 whenever the truck 12 is raised sufficiently to disengage the roller from either of the channels 55 and 56. Thus, after leaving the channel 55 on the right side of the rib 59, the roller 53 will stay on the right side of the rib until it is lowered into the channel 56, and vice versa, when the roller 53 leaves the channel 56 on the left side of the rib 59, it will stay on the left side of the rib until lowered into channel 55.

The truck 12 is moved laterally by means of the cross heads 60 which ride in horizontal guides 61. Each of the side bars 17 of truck 12 has a guide member 62 provided with a groove 63 for receiving the vertical rib 59 on a cross head 60. Vertical movement of the truck 12 on rails 11 does not release the grooves 63 from the ribs 59, and so the lateral position of the truck 12 is controlled at all times by the cross heads 60.

The cross heads 60 do not move vertically, but are moved horizontally in their guideways 61 by means of links 64 and crank arms 65 attached to a shaft 66 extending longitudinally of the machine at the right-hand side. A gear segment 67 is provided on the shaft 66 for driving the crank arms 65 through a predetermined rotary movement and reverse.

In order to facilitate acceleration and retardation of the cross heads 60 and lateral movement of the truck 12, an air-pressure cylinder 68 is provided at each side of the machine. A piston 69 operates in each cylinder to retard or accelerate the shaft 66 as its crank arms 65 are rotated to or away from their extreme positions in either direction. Each piston 69 is connected by a rod 70 to a crank arm 71 on the shaft 66. The air pressure in the cylinders is varied to suit different operating speeds and is preferably supplied from a suitable source of air pressure of large volume connected with the cylinders.

Having described the transfer mechanism in detail, the mechanism for driving the several parts will now be described. The drive mechanism may be divided into three general parts, although all are driven from a single common source of power so as to maintain synchronism of operation between the several parts. The three general parts of the drive mechanism are: the various cam drives for the assembling mechanism, for the rivet supply and driving mechanism, and for operating the carriage clamps; the crank drive for moving the truck 12 laterally; and the crank drive for raising and lowering the truck 12.

The several parts of the mechanism are driven from the main drive shaft 72 which is continuously rotated by a suitable source of power such as an electric motor or an engine (not shown).

The chief problems involved in designing the several parts of the drive mechanism, apart from that of properly timing and synchronizing the several parts of the entire machine, are to insure the least vibration possible and to obtain as rapid acceleration and deceleration of the several masses to be moved as possible consistent with smoothness of operation. The magnitude of these problems will be appreciated when it is realized that the total time for one complete cycle of operation of the entire machine is about seven seconds and that during that time many of the parts have to be accelerated and retarded twice as well as to have the requisite periods of dwell for operation of other parts.

The main drive shaft 72 is connected through suitable reduction gearing 73 to drive a shaft 74 upon which the cam 58 is mounted and which also operates the crank drive for moving the truck 12 laterally. The main drive shaft 72 is also connected through another train of reduction gearing 75 to drive a shaft 76 which operates the crank drive for moving the truck 12 vertically. The reduction obtained by gear trains 73 and 75 have the ratio of 2 to 1, thereby resulting in the driving of shaft 74 at one-half the speed of shaft 76. Shafts 74 and 76 are driven in opposite directions.

The cam drives for the assembling machine proper are mounted on shaft 74 adjacent the cam 58 and are illustrated only diagrammatically as at 77.

Cam disk 58 has a cam groove 78 in one side which coacts with roller 79 carried on a horizontal pivoted arm 80 near the free end thereof. The link 57' is pivoted to the free end of arm 80 and extends upwardly therefrom. The upper end of link 57' is pivoted to the end of a crank 81 which rotates the horizontal stub shaft 82. The shaft 82, through suitable bevel gears 83, rotates a horizontal shaft 84 which, through bevel gears 85, rotates a vertical shaft 86 at each side of the machine. Each shaft 86 has a crank 87 at its upper end connected by means of the link 57 to the reciprocating rod 54.

The cam groove 78 is designed to raise the arm 80 and link 57' and to maintain them raised during approximately one-half of the revolution of shaft 74, and then to lower them during the remaining half of the revolution, to effect the desired closing and opening of the clamping elements on the carriages 13 and 14.

The crank drive for moving the truck 12 laterally on the track 11 comprises, in general, the driving crank 88 attached to shaft 74, a plurality of arms pivoted on a common axis and connected together by means of toggle links which have their central pivots engaging a cam track, and suitable gearing driven by a gear segment on one of the arms.

In the construction shown, the crank 88 is connected to one pivoted arm 89 by means of a long connecting rod 90. A second arm 91 is pivoted at 92 in common with arm 89 and has its outer end connected by means of the toggle links 93 to the lever 89 at the point 94 where the connecting rod 90 is pivoted to the lever 89. The central pivot 95 between the toggle links 93 is provided with rollers 96 on each side adapted to ride in cam tracks 97 provided in the stationary side plates 98. The links 93 extend to the right from the arm 89 toward the crank 88, the significance of which will be pointed out later.

The arm 91 has an extension to the left of the lever 89 providing a connection for a second pair of toggle links 99 which connect arm 91 with the end of a gear segment 100 to the left of said arm 91. The gear segment 100 is also pivoted at 92. The second pair of toggle links 99 have a central pivot 101 provided on both sides with rollers 102 which ride in the cam tracks 97.

The gear segment 100 is connected by suitable gearing 103, shaft 104 and pinion 105 to drive the gear segment 67 on the shaft 66 to move the truck 12 laterally.

The problem in designing the above mechanism was to provide for the requiring dwell or rest period for the truck 12 at each end of its lateral stroke and at the same time obtain a rapid acceleration to maximum speed and retardation from such speed. To this end the cam track 97 was designed as shown with its central portion following substantially concentric to pivot point 92. The end portions of the cam track are curved differently, as will be pointed out hereinafter.

It will be noted that the dwell produced at the left end of the stroke is effected by a combination of or coaction between the crank 88, which is passing dead center, the toggle 99 which closes at this time, and the crank 65 which is also at dead center. The curvature of the cam track 97 at its end determines the length of time of the dwell period beyond that normally obtained from the dead centers of cranks 88 and 65. It will be appreciated that truck 12 must be given sufficient time to lower and rise at the end of its stroke before resuming its return stroke.

The rapid acceleration of truck 12 is effected after a period of rest by the crank 88 passing dead center and starting to increase its power stroke, the toggle 99 becoming straightened and rapidly moving the segment 100 and the crank 65 passing its dead center and increasing its stroke.

Figure 9:
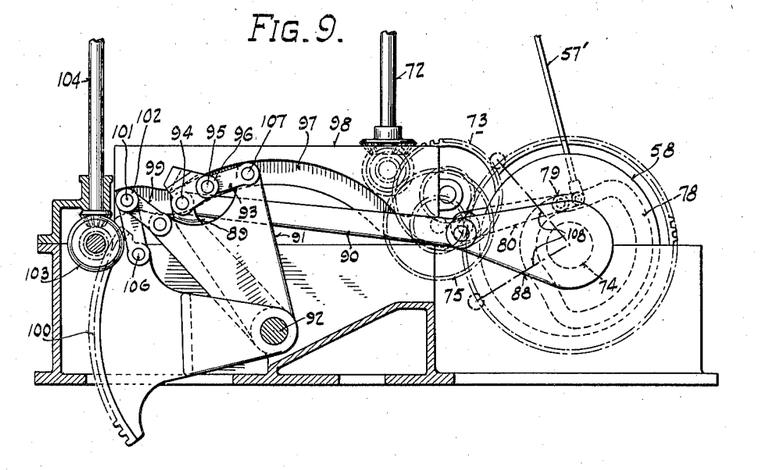
Fig. 9 is a vertical section on line 9—9 of Fig. 8 showing the drive for the carriage transfer and certain of the cam drives in one position in the cycle of operation.
Figure 10:
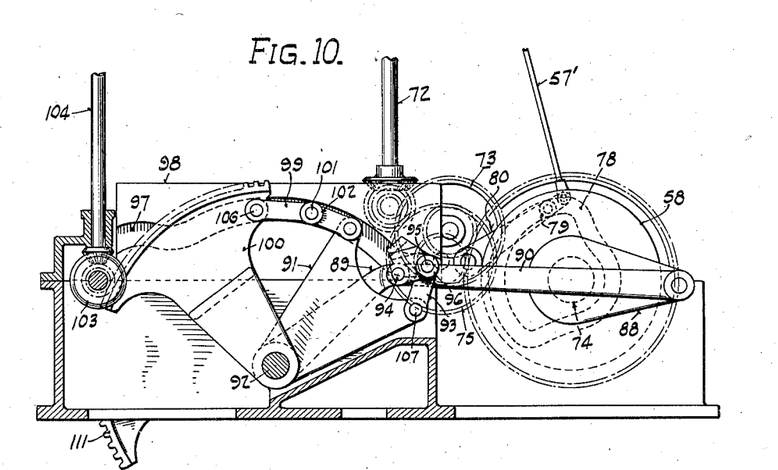
Fig. 10 is a section similar to Fig. 9 showing the drive in the opposite position of operation in the cycle.

Figure 10 illustrates the parts, shown in Fig. 9, at the other end of the stroke after retardation where the crank 88 is on its opposite dead center, the toggle 93 is closed by the end curvature of cam track 97 and the crank 65 is on its opposite dead center.

In order to obtain the full benefit of the closing of either toggle at the end of the stroke, it is preferable that the other toggle remain fully open at such time. The drawing Fig. 9 shows toggle 93 open and lying in the circular central portion of cam track 97 when the toggle 99 is closed by the outer curvature of the left end of the cam track, while Fig. 10 shows the toggle 99 open and lying in the circular central portion of the cam track 97 when the toggle 93 is closed by the outer curvature of the right end of the cam track.

The exact curvature at the ends of cam track 97 will depend upon the dimensions of the several parts and the dwell period desired at the ends of the strokes.

The left end of the cam track 97 is curved on a shorter radius concentric with the pivot point 106 on the gear segment 100, when the crank 88 is at the left, and the right end of the cam track 97 is curved on a radius concentric with the pivot point 107 on the arm 91 when the crank 88 is at the right. The proportion of length of the cam track 97 constituted by the central curved portion largely determines the period of drive, while the proportion of the cam track 97 constituted by the curved portion at each end determines the period of fixed dwell at the respective end of the stroke.

During the time that the pivot rollers 102 are riding in the left-hand portion of the cam track 97, the toggle link 99 merely closes or opens, depending upon the direction of movement of the arm 91, and it does not at that time effect any movement of the gear segment 100. Furthermore, the gear segment 100 is locked against movement at this time by the left arm of the toggle 99 and the pivot rollers 102 riding in the cam track 97.

When the crank 88 is at its right-hand position and the toggle pivot rollers 96 are riding in the curved right-hand portion of cam track 97, the toggle link 93 functions merely to open and close without moving the arm 91 and at the same time locking the arm 91 against movement. The locking of arm 91 against movement effects a locking of gear segment 100 and prevents operation of the conveyor truck laterally.

The broken lines 108 in Fig. 9 illustrate the position of crank 88 at which the pivot rollers 102 enter and leave the left-hand portion of cam track 97, thus illustrating the length of the dwell period in relation to the rotary movement of the crank 88. Similar lines could be drawn at the right side to illustrate the period of dwell when the crank 88 is at the right.

The shape of the cam track 97 in its central portion need not be concentric to the pivot point 92, but it may be flattened or it may be curved more sharply so as to control the rate of acceleration and retardation of the driven element in any desired manner.

The crank drive for operating the screw jacks 15 and elevating or lowering the tracks 11 is very similar to that just described for moving the trucks 12 laterally. The drive is operated from crank 109 on shaft 76, which, as pointed out before, is rotated twice as fast as shaft 74 and in the opposite direction. The details of the mechanism are shown in Figs. 11 and 12.

The essential difference between it and the mechanism just described lies in the fact that there is no crank corresponding to crank 65 for utilization of a dead center, and the period of dwell desired at one end of the stroke is longer than that at the other end. Furthermore, the central curved portion of the cam track is relatively short, thus providing a short working period for the drive. The dwell at the left-hand end is short, providing time only for operation of the carriage mechanism 30 to 39, inclusive, while the dwell at the right-hand end is long, providing time for the lateral transfer of the carriages.

Figure 11:
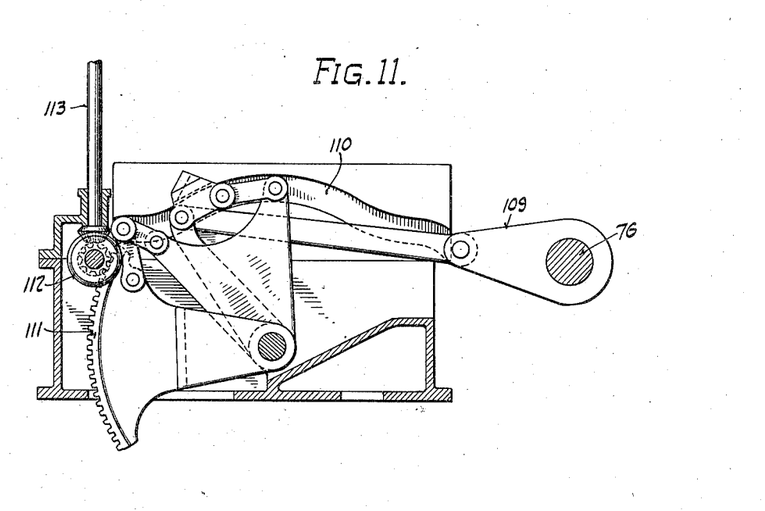
Fig. 11 is a vertical section on line 11—11 of Fig. 8 showing the drive for elevating the carriage, and certain of the cam drives in one position in the cycle of operation.
Figure 12:
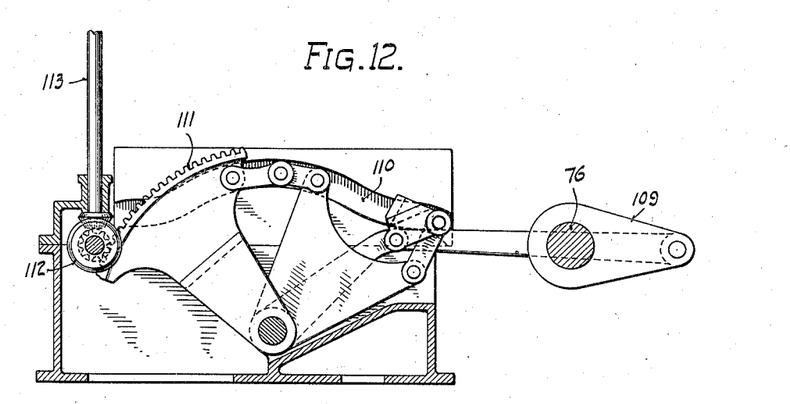
Fig. 12 is a section similar to Fig. 11 showing the drive in the opposite position of operation in the cycle.

Consequently, the cam track 110 as illustrated in Figs. 11 and 12 has a substantial curvature away from its circular path at the right end and only a reasonably small outward curvature at the other end, each end portion being concentric to the respective pivot point of the toggle link at that end as previously described with respect to Figs. 9 and 10. Since the detail mechanism for this drive is practically the same as for that described as to Figs. 9 and 10, it need not be described anew.

The gear segment 111 of this drive is connected through suitable gears 112, vertical shaft 113, gears 114, horizontal shafts 115, and gears 116 to the vertical screw jacks 15 to drive the same.

The two crank drives are designed to cooperate in a manner providing overlapping of movement of the tracks 11 vertically and of the truck 12 laterally, as illustrated by the arrows in Fig. 3 showing the path of movement of the carriages 13 and 14. This feature gives each movement a longer time of operation in a cycle of given time, and allows the cycle of operation to be shortened.

The preferred embodiment of the invention has been described in detail above, but it will be understood that various embodiments may be employed within the scope of the accompanying claims and without departing from the spirit and objects of the invention.

I claim:

1. In combination, a conveyor truck disposed for horizontal reciprocation and for vertical reciprocation through a cycle of lowering and rising at each end of the path of horizontal reciprocation, article clamping means carried by the truck and disposed to grip an article when the truck is in its lowered position at one end of its horizontal reciprocation and to release the article when the truck is in its lowered position at the other end of its horizontal reciprocation, a constantly rotating crank connected to reciprocate said truck horizontally, a second constantly rotating crank operating in synchronism with said first crank and connected to reciprocate said truck vertically, means interposed between each of said cranks and the truck for effecting a predetermined length of dwell of the truck between successive horizontal reciprocative movements and between successive cycles of vertical reciprocative movements, and means operating in synchronism with said cranks for effecting operation of said clamping means in timed relation to said reciprocative movements.

2. In combination, a conveyor truck disposed for reciprocation in a predetermined path of movement, article clamping means carried by the truck and disposed to grip an article when the truck is at one end of the path of reciprocation and to release the article when the truck is at the other end of the path of reciprocation, a constantly rotating crank for reciprocating said trunk, means interposed between said crank and said truck for modifying the movement produced by said crank to provide predetermined periods of movement and of dwell for said truck to some extent independent of the dead center positions of said crank, cam means for effecting operation of said clamping means, and a constantly rotating shaft for effecting synchronized operation of said crank and said cam means.

3. In combination, a conveyor truck disposed for horizontal reciprocation and for vertical reciprocation through a cycle of lowering and rising at each end of the path of horizontal reciprocation, article clamping means carried by the truck and disposed to grip an article when the truck is in its lowered position at one end of its horizontal reciprocation and to release the article when the truck is in its lowered position at the other end of its horizontal reciprocation, a constantly rotating crank connected to reciprocate said truck horizontally, a second constantly rotating crank operating in synchronism with said first crank and connected to reciprocate said truck vertically, means interposed between each of said cranks and the truck for effecting a predetermined length of dwell of the truck between successive horizontal reciprocative movements and between successive cycles of vertical reciprocative movements, means operating in synchronism with said cranks for effecting operation of said clamping means in timed relation to said reciprocative movements, and means for locking said clamping means in predetermined position during movement of the truck.

4. In combination, a conveyor truck disposed for horizontal reciprocation and for vertical reciprocation through a cycle of lowering and rising at each end of the path of horizontal reciprocation, article clamping means carried by the truck and disposed to grip an article when the truck is in its lowered position at one end of its horizontal reciprocation and to release the article when the truck is in its lowered position at the other end of its horizontal reciprocation, a constantly rotating crank connected to reciprocate said truck horizontally, a second constantly rotating crank operating in synchronism with said first crank and connected to reciprocate said truck vertically, and means operating in synchronism with said cranks for effecting operation of said clamping means in timed relation to said reciprocative movements.

5. In combination, a conveyor truck disposed for horizontal reciprocation and for vertical reciprocation through a cycle of lowering and rising at each end of the path of horizontal reciprocation, article clamping means carried by the truck and disposed to grip an article when the truck is in its lowered position at one end of its horizontal reciprocation and to release the article when the truck is in its lowered position at the other end of its horizontal reciprocation, and means for locking said clamping means against operation during movement of the truck.

6. In combination, a conveyor truck disposed for reciprocation, article clamping means carried by the truck and disposed to grip an article when the truck is at one end of its reciprocative movement and to release the article when the truck is at the other end of its reciprocative movement, means for reciprocating said truck and operating said clamping means in timed sequence, and means positioned by the initial movement of the truck for locking said clamping means against operation during the remaining movement of the truck.

7. In combination, a conveyor truck disposed for reciprocation in one direction and for reciprocation in another direction at the oposite ends of the first named reciprocation, a constantly rotating crank connected to reciprocate the truck in the first named direction, a second constantly rotating crank operating in synchronism with said first crank and connected to reciprocate said truck in the second named direction, and means interposed between said cranks and said truck for effecting a predetermined length of dwell of the truck between predetermined reciprocative movements in said first named direction and between predetermined reciprocative movements in said second named direction.

JULIUS B. TIEDEMANN.